United States Patent [19]

Ishikawa et al.

[11] 4,432,920
[45] Feb. 21, 1984

[54] PROCESS FOR THE PREPARATION OF POROUS MEMBRANE

[75] Inventors: Norio Ishikawa, Shiga; Morio Murayama; Yasumoto Nishijima, both of Kyoto, all of Japan

[73] Assignee: Daido-Maruta Finishing Co., Ltd., Kyoto, Japan

[21] Appl. No.: 317,202

[22] Filed: Nov. 2, 1981

[30] Foreign Application Priority Data

Nov. 7, 1980 [JP] Japan ................................ 55-156520

[51] Int. Cl.$^3$ ............................................. B29D 27/04
[52] U.S. Cl. ........................................ 264/49; 264/41; 521/61; 521/65
[58] Field of Search ..................... 264/41, 49; 521/61, 521/65

[56] References Cited

U.S. PATENT DOCUMENTS

| | | | |
|---|---|---|---|
| 2,673,825 | 3/1954 | Biefeld et al. | 264/41 X |
| 2,846,727 | 8/1958 | Bechtold | 521/61 X |
| 3,256,228 | 6/1966 | Tyran | 521/61 X |
| 3,308,073 | 3/1967 | Kepple | 264/49 X |
| 3,518,332 | 6/1970 | Sklarchuk et al. | 264/49 |
| 3,536,796 | 10/1970 | Rock | 264/49 |
| 3,661,645 | 3/1972 | Strier et al. | 521/61 X |
| 4,256,845 | 3/1981 | Morris et al. | 521/61 |

FOREIGN PATENT DOCUMENTS 1327602 8/1973 United Kingdom ................ 264/49

*Primary Examiner*—Philip E. Anderson
*Attorney, Agent, or Firm*—Paul J. Sutton

[57] ABSTRACT

A process for the preparation of a porous membrane is provided which comprises the steps of preparing an aqueous dispersion system by dispersing a first material in water, said first material being selected from the group consisting of waxy substances, fatty substances and mixtures thereof and having a melting point of from the room temperature to 100° C., admixing with said aqueous dispersion system an aqueous solution or aqueous dispersion of a second material selected from the group consisting of high polymers and compounds forming high polymers when irradiated by light rays, forming a membrane from the admixture, drying said membrane to evaporate water therefrom and removing said waxy substances and said fatty substances contained in the dried membrane by extracting the same by the use of a solvent.

16 Claims, 1 Drawing Figure

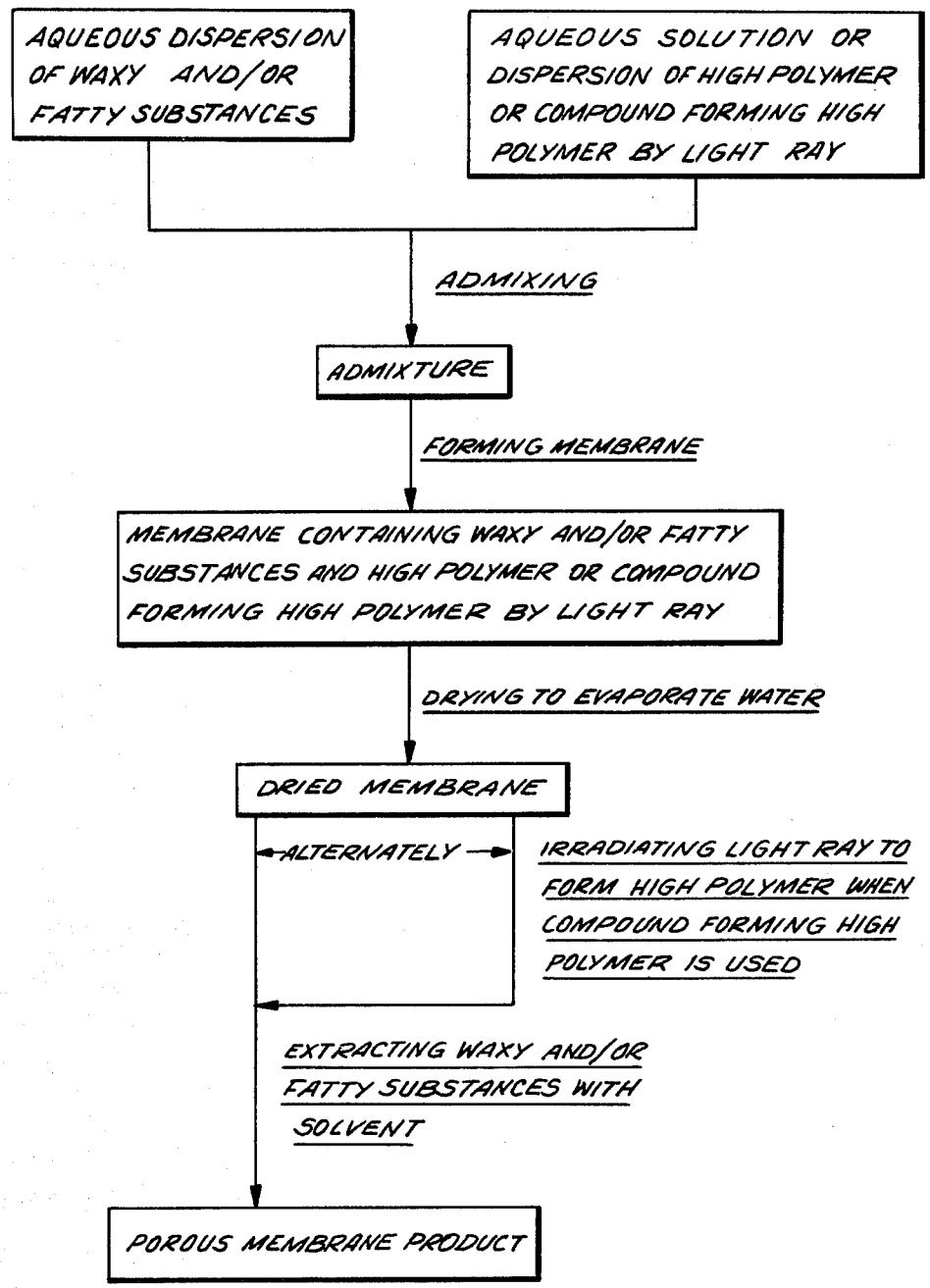

PROCESS FOR THE PREPARATION OF POROUS MEMBRANE

BACKGROUND OF THE INVENTION

1. Field of the Invention

This invention relates to a process for the preparation of a porous membrane, and particularly to a process for making a porous membrane using waxy and/or fatty substances.

2. Prior Art

It has hitherto been known a process for the preparation of a porous membrane made of polyvinyl alcohol, wherein an aqueous solution of polyvinyl alcohol is prepared, then vinyl acetate is added to the aqueous solution, and said vinyl acetate is emulsion-polymerized using a redox polymerization initiator of tartaric acid-hydrogen peroxide system to prepare an aqueous dispersion of polyvinyl acetate, followed by drying to form a membrane and extracting and removing the polyvinyl acetate from said membrane using a solvent. In the membrane prepared by this known process, a number of void pores is formed by extracting with a solvent fine particles of the polyvinyl acetate dispersed uniformly in the polyvinyl alcohol. The membrane thus formed is an interesting and unique one in that the void pores thereof are communicated with each other and the porosity of the membrane reaches up to about 0.87, and it has been expected that the membrane must be of wide utility when used as filtering and absorbing materials, for example in the technical fields of foodstuff, medical treatments and processes for treating waste water.

However, this known process has the following disadvantages. It is inevitable to use a water-soluble high polymer, such as polyvinyl alchol, since a porous membrane is formed by the emulsion polymerization of vinyl acetate. As a result, the membrane made of a water-soluble high polymer is necessarily subjected to a treatment for allowing the same to be insoluble in water. A further disadvantage is that a particular polymerization initiator must be used under a particular emulsion polymerization condition to form a porous membrane, since vinyl acetate is used as the starting material. Accordingly, this known process is not always satisfactory in view of the producibility and economical standpoint because of the aforementioned limitations in production steps. A still further disadvantage of this known process resides in that the porosity of the resultant porous membrane is hardly to be controlled or modified freely, since the condition for the emulsion polymerization step included therein is limited as aforementioned.

OBJECTS AND SUMMARY OF THE INVENTION

A primary object of this invention is to provide an economical process of high producibility for the preparation of a porous membrane through simplified steps.

Another object of this invention is to provide a process for the preparation of a porous membrane in a short period of time at high efficiency.

A further object of this invention is to provide a process for the preparation of a variety of porous membranes from various kinds of materials, depending on the applied uses and desired characteristics, including the materials other than water-soluble high polymers.

A still further object of this invention is to provice a process for the preparation of a porous membrane having a porosity which can be controlled or modified as desired.

The above and other objects of this invention and advantages thereof will become apparent from the following detailed description.

According to the invention, there is provided a process for the preparation of a porous membrane consisting essentially of the steps of preparing an aqueous dispersion system by dispersing a first material in water, said first material being selected from the group consisting of waxy substances, fatty substances and mixtures thereof and having a melting point of from the room temperature to 100° C., admixing with said aqueous dispersion system an aqueous solution or aqueous dispersion of a second material selected from the group consisting of high polymers and compounds forming high polymers when irradiated by light rays, forming a membrane from the admixture, drying said membrane to evaporate water therefrom and removing said waxy substances and said fatty substances contained in the dried membrane by extracting the same by the use of a solvent.

The attached drawing is a flow sheet or chart illustrating the process of the present invention.

DESCRIPTION OF THE INVENTION

The present invention will be described in detail hereinafter. The important feature of this invention resides in that the porous portions of the membrane, which definitely form void pores, are occupied by waxy and/or fatty substances each having a melting point ranging within the room temperature to 100° C., and the waxy and/or fatty substances in said portions are extracted by a solvent to form a porous membrane. The waxy and/or fatty substances mentioned above can be extracted simply within a short period of time by the use of a solvent without affecting adverse influence on the high polymer forming the membrane portions, and the extraction operation can be performed completely.

In preparation of the porous membrane according to the process of this invention, and illustrated in the drawing, the aforementioned waxy and/or fatty substances are initially emulsified in water to form an aqueous dispersion system. In the step of preparing the aqueous dispersion system, or dispersion-in-water, it is preferred that waxy and/or fatty substances and a surface active agent be heated to a temperature of higher than the melting point or points of the used waxy and/or fatty substances under normal or reduced pressure, followed by agitation while adding hot water to emulsify or suspend the waxy and/or fatty substances, and then the aqueous dispersion system is cooled. The temperature, at which the waxy and/or fatty substances are heated, is not critical and varies depending on the melting temperatures of the used waxy and/or fatty substances to allow the same to be easily emulsified or suspended in water. The temperature of the added hot water is, similarly, not critical, but it is desirous to use hot water maintained at a temperature higher than the melting point or points of the used waxy and/or fatty substances. The waxy and/or fatty substances can be emulsified or suspended in water through a simple manner within a short period of time, as has been mentioned hereinabove.

As described above, the waxy and/or fatty substances used in this invention should have the melting points of from the room temperature to 100° C., preferably 35° C. to 95° C. If the melting point of the substance is lower than the room temperature, oily droplets of the oil-inwater emulsion will collapse when water is evaporated at the step of drying the admixture of the aqueous dispersion of the waxy and/or fatty substances with the high polymer or the compound forming a high polymer when irradiated by light rays, and it becomes, as a result, impossible to obtain a porous membrane having desired properties. On the contrary, if any one of the melting points of the waxy and/or fatty substances exceeds 100° C., it becomes difficult to emulsify the substances in water and the extraction thereof by a solvent also becomes difficult.

The waxy substances which may be used in this invention include natural waxes, such as animal waxes, vegetable waxes and mineral waxes, and synthetic waxes. Preferred animal waxes include bees wax, whale wax, and lanolin. Preferred vegetable waxes include rice bran wax, carnauba wax, candelilla wax, haze wax and cotton wax, and preferred mineral waxes include montan wax, ozokerite wax, ceresine, paraffin waxes, microcrystalline waxes and petrolatum. Amongst them, particularly preferred wax is paraffin wax. Preferable synthetic waxes include chlorinated paraffins, fatty acid amides, higher fatty acids and higher alcohols.

In the meanwhile, the fatty substances which may be used according to the invention include fatty substances of animal and vegetable origins, the animal-origin fatty substances including anhydrous lanolin (sheep fat), hardened beef tallow, hardened fish oils and hardened whale oil and preferred vegetable-origin fatty substances including coconut oil, palm kernel oil, stearin and hardened vegetable oils. The most preferred is anhydrous lanolin.

In the process of this invention, the waxy substances and the fatty substance may be used individually or in combination.

The surface active agents which may be used to emulsify the waxy and/or fatty substances in the process of this invention include non-ionic surfactants and anionic surfactants. Preferable non-ionic surfactants are, for example, polyoxyethylene alkyl ethers such as polyoxyethylene stearin ether and polyoxyethylene oleyl ether, polyoxyethylene alkylphenol ethers such as polyoxyethylene octylphenol ether, and esters of sorbitan fatty acids such as sorbitan monolaurate and sorbitan monostearate. Preferable anionic surfactants include sodium, potassium and amine salts of higher fatty acids. It is a common practice to use non-ionic surfactants individually or in combination, each of the surfactants having HLB value depending on the oleophillic degree and hydrophillic degree of the used waxy and/or fatty substances.

An aqueous solution or dispersion of a second material selected from a variety of high polymers and compounds which form polymers when irradiated by light rays, is admixed into the aforementioned aqueous dispersion system prepared in the manner as described above. When a water-soluble polymer is used as the high polymer or the compound forming a high polymer when irradiated by light rays, namely when a water-soluble substance is used as the second material as defined in the appended claims, an aqueous solution of such a substance, generally a 5 to 15 wt% solution thereof, is prepared. On the other hand, when a hydrophobic substance is used as the second material, a dispersion thereof in water may be prepared or otherwise commercially available products may be used. Anyway, according to the present invention, the high polymer or polymer-forming compound by light rays as defined by this invention needs only to be mixed with the aqueous dispersion of the first material, i.e. the aqueous dispersion system of the first material as defined in the appended claims, under agitation to form a uniformly dispersed mixture, which is then subjected to the steps as will be described in detail hereinafter to form a porous membrane of this invention. This invention has an advantageous merit in that the process of this invention comprises mere mixing and admixing steps. More specifically, an aqueous solution or an aqueous dispersion of the second material, i.e. a water-soluble or water-insoluble high polymer which already forms a polymer or a compound which forms a high polymer when irradiated by light rays, may be merely admixed to the aqueous dispersion system of the first material without the necessity of emulsion polymerization of the material monomers, which has been hitherto necessitated in the known processes. Therefore, disadvantageous and inconvenient limitations in connection with the selection of the starting materials, polymerization catalysts and in connection with polymerization conditions can be obviated, and the materials for forming the membrane can be selected from a wider range depending on the applied uses or desired properties of the final membrane product.

Preferable examples of the water-soluble high polymer include synthetic high polymers such as polyvinyl alcohol, water-soluble acrylic resins, polyvinyl pyrrolidone, water-soluble alkyd resins and water-soluble polyesters, cellulose derivatives such as hydroxyethyl cellulose, methyl cellulose and carboxymethyl cellulose, processed natural rubbers such as Maypro gum and Indulca gum and natural high polymers such as sodium alginate, gum arabi, casein and gelatine. Particularly preferred are polyvinyl alcohol, water-soluble acrylic resins and water-soluble polyesters.

Preferable hydrophobic high polymers used in this invention include acrylic ester polymers, vinyl acetate base polymers, vinyl chloride base polymers, vinylidene chloride base polymers, styrene-butadiene base polymers, chloroprene base polymers, acrylonitrile-butadiene base polymers, urethane base polymers and methylmethacrylate-butadiene base polymers, particularly preferred being acrylic ester polymers and vinyl acetate base polymers.

Preferable compounds which form high polymers when irradiated by light rays, include photo-dimerizable and photo-sensitive resins such as cinnamic ethers of polyvinyl alcohol, photo-decomposable and photo-sensitive resins such as azide esters of polyvinyl alcohol or diazonium salts, photo-reactive substances such as mixtures of polyvinyl alcohol and azide compounds, and mixtures thereof.

The aqueous solution or dispersion of said high polymer or said compound which forms a high polymer when irradiated by light rays may contain a plasticizer, a viscosity modifier and a polymerization initiator, as desired. The weight ratio in solid base of the first material to the second material, i.e. the mixing ratio of the waxy and/or fatty substances to the high polymer or the compound forming a high polymer by light irradiation, is desirously within the range of 1:0.15 to 1:4. If the weight ratio of the second material per unit weight of the first material is less than 0.15, the strength of the resultant membrane might be lowered to an unsatisfactory level. On the contrary, if the ratio is increased to more than 1:4, there arises a fear that a porous membrane would not be formed. The porosity of the resultant porous membrane can be controlled by selecting a suitable mixing ratio.

After mixing the aqueous solution or aqueous dispersion of the high polymer or the compound forming a high polymer by light irradiation, i.e. the second material as defined in the claims, with the aqueous dispersion of the waxy and/or fatty substances, i.e. the first material, the mixture is spread in the form of a membrane, from which water is evaporated to dryness. The membrane may be formed only by spreading said mixture on a flat plate and then allowed to stand at room temperature for around one to three days to evaporate water, whereby a dry membrane is obtained. A cylindrical or otherwise-shaped membrane may be formed by casting the mixture in a mold of cylindrical or other desired shapes. When a compound which forms a high polymer when irradiated by light rays is used, the high polymer is formed by irradiating light rays, such as ultraviolet rays or visible rays, after the evaporating or drying step.

Then, said waxy and/or fatty substances in the dried membrane are extracted by a solvent to remove the same from the membrane. Extraction may be effected by immersing the membrane in a solvent or by using a known extractor operated at the boiling point of the used solvent. As to the usable solvents, any of the known solvents which sufficiently dissolve the used waxy and/or fatty substances and which do not swell nor dissolve the high polymer forming the membrane without giving adverse affect may be selected. Detailed description of such solvents will not be given herein, because it is believed that the solvation power and the related properties of the solvents are well known in the art and embraced within the ordinary skill of the engineers in this field of art.

The preferable solvent which may be used in this invention include aliphatic hydrocarbons such as n-hexane, n-heptane, n-octane, petroleum ether, petroleum benzine, ligroine and gasoline; aromatic hydrocarbons such as benzene, toluene and ethyl benzene; halogenated hydrocarbons such as trichloroethylene, perchloroethylene and carbon tetrachloride; alcohols such as methyl alcohol, ethyl alcohol and isopropyl alcohol; ketones such as acetone, methyl ethyl ketone and methyl isobutyl ketone; and esters such as methyl acetate and ethyl acetate.

When polyvinyl alcohol, a water-soluble acrylic resin, acrylic ester base polymer or vinyl acetate base polymer is used as the high polymer, paraffin wax is used as the waxy substance, and anhydrous lanolin is used as the fatty substance; it is recommended to use a solvent selected from aliphatic hydrocarbons, preferably an aliphatic hydrocarbon having a boiling point of from 40° C. to 100° C., for example n-hexane, n-heptane, petroleum ether or petroleum benzine.

After the extraction treatment by the use of a solvent, the membrane is subjected to drying at room temperature under normal pressure or subjected to drying under vacuum to obtain a porous membrane. The porous membrane produced in accordance with this invention includes a number of uniformly-distributed pores and the porosity thereof can be increased to more than 0.8.

EXAMPLES OF THE INVENTION

The present invention will be described in detail hereinafter by referring to the examples thereof, Meanwhile, "part" and "%" appearing in the following Examples stand for, respectively, "part by weight" and "% by weight".

EXAMPLE 1

(1) Emulsification of Paraffin Wax:

40 g of paraffin wax (Melting Point: 125° F., 52° C.) and 6 g of a mixture of non-ionic surface active agents (a mixture of 3.25 g of polyoxyethylene stearyl ether, 1.0 g of polyoxyethylene oleyl ether and 1.75 g of sorbitan monostearate) were weighed and put into a container, and heated to 105° C. to be melted.

Then, 54 g of hot water maintained at 95° C. to 100° C. was added little by little under agitation to form a water-in-oil emulsion, which is then inverted into an oil-in-water emulsion, followed by completion of the addition of all of the hot water. After then, the emulsion was rapidly cooled on an ice bath to 30° C. while agitating vigorously, and the impurities were removed by filtering through a filter cloth of 150 meshes to obtain a dispersion of paraffin in water containing 47 wt% of the solid content.

(2) Preparation of Aqueous Solution of Polyvinyl Alcohol:

90 g of hot water was added to 10 g of polyvinyl alcohol (produced by Nippon Synthetic Chemical Industry Co., Ltd. under the Trade Name of "Gohsenol NW-11") and the mixture was agitated for about 1 hour to dissolve polyvinyl alcohol and then allowed to stand for cooling for 24 hours followed by defoaming to obtain an aqueous solution of polyvinyl alcohol containing 10.6% of the solid content.

(3) Preparation of Porous Membrane:

100 g of the aqueous dispersion of paraffin wax prepared as aforementioned was mixed with 100 g of the aforementioned aqueous solution of polyvinyl alcohol and agitated. The mixture was spread over a polyethylene plate, which was allowed to stand in a room maintained at 28° C. for 48 hours, and then water in the mixture was evaporated to obtain a dried membrane. Then, the paraffin wax contained in the membrane was removed by extracting the same for 2 hours by petroleum ether using a Soxhlet extractor, followed by drying under vacuum, to obtain a porous membrane.

The paraffin wax was completely extracted by the aforementioned extraction operation, and the thickness of the thus obtained porous membrane was 0.7 mm, and the porosity thereof was 0.81. This porous membrane was flexible and the pore distribution was uniform. The permeation rates of n-hexane and benzene permeating through this porous membrane were measured by using a reverse osmosis filter Model RO-3 (produced by Bio-engineering Co.) to reveal that the rate for n-hexane was 0.099 ml/cm$^2$.sec and that for benzene was 0.055 ml/cm$^2$.sec under a pressure of 0.5 kg/cm$^2$.

EXAMPLE 2

(1) Emulsification of Paraffin Wax:

Paraffin wax was emulsified in the same manner as described in Example 1 to obtain an aqueous dispersion of paraffin wax containing 47.0 wt% of the solid content.

(2) Preparation of Aqueous Dispersion of Polyvinyl Acetate:

250 g of the aqueous solution of polyvinyl alcohol (solid Content: 10.6%) as prepared in Example 1 was weighed and put into a one-liter four-necked separable flask to which an agitator, a thermometer and two Allihn type reflux coolers were fitted. The flask was put into a water bath provided with a manually-operated and automatically-operated temperature controllers.

200 g of vinyl acetate monomer was added thereinto through a cooling tube while maintaining the temperature of the water bath at 70° C. to 75° C. by manual operation. After the temperature in the flask was raised to 65° C., 0.5 g of tartaric acid was adeed, and then 2 g of a 30% solution of hydrogen peroxide was added at 68° C. as the polymerization initiators. After the content in the flask began to become cloudy or milky and the polymerization reached the state for further polymerization (this being the time point of 15 to 20 minutes after the starting time, when the temperature was transiently lowered to about 65° C.) control operation was changed so that the temperature of the water bath was controlled by the manually-operated controller. After polymerization proceeded further and the temperature in the flask was raised to 85° C., the content in the flask was maintained at that state for 30 minutes to complete polymerization. Then, the temperature of the content in the flask was lowered to 35° C. and allowed to stand for one day followed by defoaming. As a result, an emulsion polymerization product of vinyl acetate, namely an aqueous dispersion of polyvinyl acetate was obtained at a polymerization rate of more than 99% and at a solid content of 46%.

(3) Preparation of Porous Membrane:

100 g of the aqueous dispersion of paraffin wax described as above was added to 25 g of the aforementioned aqueous dispersion of polyvinyl acetate, and was agitated to be mixed together, and then the mixture was spread over a polyethylene plate, which was dried to form a membrane. The dried membrane was subjected to the extraction and vacuum drying operations similar to Example 1 to obtain a product having a porosity of 0.80.

This porous membrane was rather slightly coarse and hard, but it had pores distributed uniformly and was not deformed after being allowed to stand for 72 hours in water at normal temperature.

EXAMPLE 3

Instead of the aqueous dispersion of polyvinyl acetate as used in Example 2, a commercially available aqueous dispersion of polyvinyl acetate (commonly called under the name of SAKUBI emulsion, produced by Nippon Carbide Industries Co., Ltd. under the Trade Name of "Nikazol CL-10", Solid Content: 53%) was used. Other procedures in the experiment were similar to Example 2. A porous membrane was obtained, and the extraction ratio of the paraffin wax was 98%, the porosity of the membrane was 0.78 and the thickness of the membrane was 0.8 mm. The permeation rate of n-hexane at normal pressure permeating through this porous membrane was measured in the similar manner as in Example 1 to find that the rate was 0.101 ml/cm$^2$.sec.

EXAMPLE 4

Anhydrous lanolin was used instead of the aqueous dispersion of the paraffin wax as used in Example 2.

(1) Emulsification of Anhydrous Lanolin:

80 g of anhydrous lanolin (produced by Maruishi Seiyaku K.K.) and 20 g of a mixture of non-ionic surface active agents (a mixture of 16 g of polyoxyethylene oleyl ether and 4 g of sorbitan monostearate) were weighed and put into a vessel, which was heated to 90° C. to melt the content, and 200 g of hot water of 90° C. was added under agitation little by little. After the total amount of hot water was added, the content in the vessel was rapidly cooled to 30° C. while agitating vigorously to obtain an aqueous dispersion of lanolin having a solid content of 35.7%.

(2) Preparation of Porous Membrane:

150 g of the aforementioned aqueous dispersion of lanolin was mixed with 50 g of the aqueous dispersion of polyvinyl acetate obtained in Example 2, and the mixture was spread over a polyethylene plate. Then, the membrane was deprived of lanolin by extracting with n-hexane as the solvent, and dried under vacuum. The porous membrane thus obtained had uniformly distributed pores, and the porosity thereof was 0.67 and the extracted ratio of the lanolin was 99.2%.

EXAMPLE 5

50 g of a photo-setting diazonium photosensitive resin and 5 g of a 50% aqueous solution of a diazo-sensitizer powder (produced by F,Lli Manoukian-Frama SpA Industria Chemica under the Trade Name of Azopoligel, Solid Content: 33%) were mixed with 100 g of the aqueous dispersion of paraffin wax as prepared in Example 1, and the mixture was spread over a polyethylene plate, which was put in an air-conditioned chamber maintained at a relative humidity of less than 40% and at a temperature of 28° C. and allowed to stand therein for 24 hours. Then, the plate was exposed to sun light for 2 hours, and was further dried at room temperature for additional 24 hours. The plate was then immersed into petroleum ether for 6 hours to extract and to remove the paraffin wax. The thus obtained porous membrane had uniformly-distributed pores, and the extracted rate of the paraffin wax was 92%, the porosity of the membrane was 0.74, and the membrane was not deformed even slightly after it was immersed in water for 72 hours.

EXAMPLES 6 TO 21

Each of the hydrophilic high molecular polymers as set forth in Table 1 was used as porous membrane forming material, and the waxy and/or fatty substances and the extraction solvents also as set forth in Table 1 were used to prepare each of the porous membranes shown in Table 1.

The polyvinyl alcohols used in Examples 6 to 18 are commercially available ones, from which each aqueous solution was prepared in the same manner as described in Example 1. The polyvinyl pyrrolidone aqueous solution as used in Examples 19 and 20 and the aqueous solution of polyester as used in Example 21 were the commercially available aqueous solution which were used as they were procured in the market.

Anhydrous lanolin used in Example 6 was emulsified in a similar manner as described in Example 4. Rice bran wax used in Example 7 and carnauba wax used in Example 8 were emulsified in a similar manner as described in Example 1, except in that the mixture of non-ionic surface active agents as used in Example 1 was used in both of Examples 7 and 8, the HLB values of the mixed surfactants being 12.8 for Example 7 and 15.0 for Example 8.

The other procedures were the same as in Example 1 to obtain the porous membranes as set forth in Table 1.

The porous membranes obtained in Examples 6 to 21 each had extraction rate of the waxy and/or fatty substances of higher than 98%. Membranes having uniformly distributed pores were produced by these Examples. The porous membranes obtained by Examples 6 to 18 were flexible, and the porous membranes obtained by Examples 19 and 20 were somewhat harder than those obtained by Examples 6 to 18. The porous membrane obtained by Example 21 was soft. Any of these membranes were excellent in solvent-proof property.

As should be appreciated by comparing the membranes obtained by Examples 16 with 17 and those obtained by Examples 19 with 20, respectively, the porosities of the membranes could be varied by a simple manner of changing the mixing ratio of A/B. It will be, thus, understood from such a comparison that membranes different in their porosities can be prepared depending on the applications or uses in a simple manner.

TABLE 1

| Ex. | Porous Membrane Forming Material (A) (Solid Content, wt %) | Waxy substance and/or Fatty Substance (B) (Boiling Point) | Solid Content of Aqueous Dispersion of Waxy Substance and/or Fatty Substance (wt %) | Mixed Ratio in Weight of A/B (Solid Base) | Extracting Solvent (Boiling Point) | Porosity |
|---|---|---|---|---|---|---|
| 6 | Polyvinyl Alcohol Trade Name: Gohsenol NW-11 Produced by Nippon S.C.I. Co.* (10.6 wt %) | Anhydrous Lanolin (35–42° C.) | 35.7 | 1:1 | n-Hexane (66–70° C.) | 0.76 |
| 7 | Polyvinyl Alcohol Trade Name: Gohsenol NW-11 Produced by Nippon S.C.I. Co.* (10.6 wt %) | Rice Bran Wax Trade Name: R-Wax KG-B Produced by Kuroda Kako K.K. (79° C.) | 45.0 | 1:1 | n-Hexane (66–70° C.) | 0.79 |
| 8 | Polyvinyl Alcohol Trade Name: Gohsenol NW-11 Produced by Nippon S.C.I. Co.* (10.6 wt %) | Carnauba Wax (82–85.5° C.) | 36.5 | 1:1 | n-Hexane (66–70° C.) | 0.75 |
| 9 | Polyvinyl Alcohol Trade Name: Gohsenol NW-11 Produced by Nippon S.C.I. Co.* (10.6 wt %) | Paraffin Wax (52° C.) | 47.0 | 1:1 | n-Hexane (66–70° C.) | 0.81 |
| 10 | Polyvinyl Alcohol Trade Name: Gohsenol NW-11 Produced by Nippon S.C.I. Co.* (10.6 wt %) | Paraffin Wax (52° C.) | 47.0 | 1:1 | Benzene (79–82° C.) | 0.80 |
| 11 | Polyvinyl Alcohol Trade Name: Gohsenol NW-11 Produced by Nippon S.C.I. Co.* (10.6 wt %) | Paraffin Wax (52° C.) | 47.0 | 1:1 | Toluene (110–112° C.) | 0.78 |
| 12 | Polyvinyl Alcohol Trade Name: Gohsenol NW-11 Produced by Nippon S.C.I. Co.* (10.6 wt %) | Paraffin Wax (52° C.) | 47.0 | 1:1 | Carbon Tetrachloride (76–77.5° C.) | 0.80 |
| 13 | Polyvinyl Alcohol Trade Name: Gohsenol NW-11 Produced by Nippon S.C.I. Co.* (10.6 wt %) | Paraffin Wax (52° C.) | 47.0 | 1:1 | Ethyl Alcohol (78.3° C.) | 0.76 |
| 14 | Polyvinyl Alcohol Trade Name: Gohsenol NW-11 Produced by Nippon S.C.I. Co.* (10.6 wt %) | Paraffin Wax (52° C.) | 47.0 | 1:1 | Acetone (55–56° C.) | 0.80 |
| 15 | Polyvinyl Alcohol Trade Name: Gohsenol NW-11 Produced by Nippon S.C.I. Co.* (10.6 wt %) | Paraffin Wax (52° C.) | 47.0 | 1:1 | Ethyl Acetate (76° C.) | 0.80 |
| 16 | Polyvinyl Alcohol Trade Name: Gohsenol NW-11 Produced by Nippon S.C.I. Co.* (10.6 wt %) | Paraffin Wax (52° C.) | 47.0 | 3:1 | Petroleum Ether (30–70° C.) | 0.57 |
| 17 | Polyvinyl Alcohol Trade Name: Gohsenol NW-11 | Paraffin Wax (52° C.) | 47.0 | 7:1 | Petroleum Ether (30–70° C.) | 0.37 |

TABLE 1-continued

| Ex. | Porous Membrane Forming Material (A) (Solid Content, wt %) | Waxy substance and/or Fatty Substance (B) (Boiling Point) | Solid Content of Aqueous Dispersion of Waxy Substance and/or Fatty Substance (wt %) | Mixed Ratio in Weight of A/B (Solid Base) | Extracting Solvent (Boiling Point) | Porosity |
|---|---|---|---|---|---|---|
| 18 | Polyvinyl Alcohol Trade Name: Gohsenol N-300 Produced by Nippon S.C.I. Co.* (10.6 wt %) | Paraffin Wax (52° C.) | 47.0 | 1:1 | Petroleum Ether (30–70° C.) | 0.82 |
| 19 | Polyvinylpyrrolidone Aqueous Solution Trade Name: Vinypyrone Produced by Kuroda Kako K.K. (8.5 wt %) | Paraffin Wax (52° C.) | 47.0 | 1:2 | Petroleum Ether (30–70° C.) | 0.71 |
| 20 | Polyvinylpyrrolidone Aqueous Solution Trade Name: Vinypyrone Produced by Kuroda Kako K.K. (35.3 wt %) | Paraffin Wax (52° C.) | 47.0 | 1:3 | Petroleum Ether (30–70° C.) | 0.79 |
| 21 | Polyester Aqueous Solution Trade Name: Finetex ES-650 Produced by Dainippon I.A.C. Inc.** (29.7 wt %) | Paraffin Wax (52° C.) | 47.0 | 2:3 | Petroleum Ether (30–70° C.) | 0.68 |

Note:
*Nippon Synthetic Chemical Industry Co., Ltd.
**Dainippon Ink And Chemical Incorporated.

EXAMPLES 22 TO 25

Porous membranes were produced using hydrophobic high polymers as set forth in Table 2 as porous membrane forming materials, using waxy substances and extraction solvents as set forth in the same Table.

The porous membrane forming materials used in Examples 22 to 25 were commercially available products which were used without any treatment. The paraffin waxes used in Examples 22 to 25 were emulsified in the same manner as in Example 1. The other procedures were the same as in Example 1.

The porous membranes obtained by Examples 22 to 25 were higher than 98% in their extraction ratio, and had uniformly distributed pores. The membranes obtained by Examples 22 and 23 were hard, and the membrane obtained by Example 24 was soft. The membrane obtained by Example 25 was soft and more elastic than the membranes obtained by the other Examples.

As will be apparent by comparing Example 22 with Example 23, the porosity of the membrane can be readily and simply varied by changing the mixing ratio of A/B.

TABLE 2

| Ex. No. | Porous Membrane Forming Material (A) (Solid Content, wt %) | Waxy Material (B) (Boiling Point) | Solid Content of Aqueous Dispersion of Waxy Substance (wt %) | Mixed Ratio in Weight of A/B (Solid Base) | Extracting Solvent (Boiling Point) | Porosity |
|---|---|---|---|---|---|---|
| 22 | Polyvinylchloride Emulsion Trade Name: PVC Latex Zeon 576 Produced by Nippon Zeon Co., Ltd. (55.0 wt %) | Paraffin Wax (52° C.) | 47.0 | 1:2 | Petroleum Ether (30–70° C.) | 0.62 |
| 23 | Polyvinylchloride Emulsion Trade Name: PVC Latex Zeon 576 Produced by Nippon Zeon Co., Ltd. (55.0 wt %) | Paraffin Wax (52° C.) | 47.0 | 1:3 | Petroleum Ether (30–70° C.) | 0.70 |
| 24 | Acrylic Ester Emulsion Trade Name: Tocryl W-142 Produced by Toyo Ink Mfg. Co., Ltd. (44.0 wt %) | Paraffin Wax (52° C.) | 47.0 | 1:2 | Petroleum Ether (30–70° C.) | 0.67 |

TABLE 2-continued

| Ex. No. | Porous Membrane Forming Material (A) (Solid Content, wt %) | Waxy Material (B) (Boiling Point) | Solid Content of Aqueous Dispersion of Waxy Substance (wt %) | Mixed Ratio in Weight of A/B (Solid Base) | Extracting Solvent (Boiling Point) | Porosity |
|---|---|---|---|---|---|---|
| 25 | Urethane Emulsion Trade Name: Vondic 1310 NS Produced by Dainippon Ink And Chemicals, Incorporated (32.1 wt %) | Paraffin Wax (52° C.) | 47.0 | 2:3 | Acetone (55–56° C.) | 0.60 |

While the present invention has been described with reference to the specific examples thereof, it should not be limited only to these presently preferred examples. It is intended that all changes and modifications which will be easily made by those skilled in the art and fall within the scope of the present invention shall be interpreted as being covered by the appended claims.

What is claimed is:

1. A process for the preparation of a porous membrane having a number of uniformly distributed pores consisting essentially of the steps of preparing an aqueous dispersion system by dispersing a first material in water, said first material being selected from the group consisting of waxy substances, fatty substances, and mixture thereof and having a melting point of from the room temperature to 100° C., admixing with said aqueous dispersion system an aqueous solution or aqueous dispersion of a second material selected from the group consisting of high polymers and compounds forming high polymers when irradiated by light rays, forming a membrane from the admixture, drying said membrane to evaporate water therefrom and removing said waxy substances and said fatty substances contained in the dried membrane by extracting the same by the use of a solvent.

2. A process as claimed in claim 1, wherein said waxy substance is selected from the group consisting of animal waxes, vegetable waxes, mineral waxes, synthetic waxes and mixtures thereof.

3. A process as claimed in claim 2, wherein said waxy substance is selected from the group consisting of beeswax, whale wax, lanolin, rice bran wax, carnauba wax, candelilla wax, haze wax, cotton wax, montan wax, ozokelite wax, ceresine, paraffin waxes, microcrystalline waxes, petrolatum, chlorinated paraffins, fatty acid amides, higher fatty acids, higher alcohols and mixtures thereof.

4. A process as claimed in claim 1, wherein said fatty substance is selected from the group consisting of animal fats, vegetable fats and mixtures thereof.

5. A process as claimed in claim 4, wherein said fatty substance is selected from the group consisting of anhydrous lanolin, hardened beef tallow, hardened fish oils, hardened whale oil, coconut oil, palm kernel oil, stearin, hardened vegetable oils and mixtures thereof.

6. A process as claimed in claim 1, wherein said high polymer is selected from the group consisting of water-soluble high polymers and hydrophobic high polymers.

7. A process as claimed in claim 6, wherein said water-soluble high polymer is selected from the group consisting of synthetic high polymers, cellulose derivatives, processed natural rubbers and natural high polymers.

8. A process as claimed in claim 7, wherein said water-soluble high polymer is selected from the group consisting of polyvinyl alcohol, water-soluble acrylic resins, polyvinyl pyrrolidone, water-soluble alkyd resins, water-soluble polyesters, hydroxyethyl cellulose, methyl cellulose, carboxymethyl cellulose, Maypro gum, Indulca gum, sodium alginate, gum alabi, casein and gelatin.

9. A process as claimed in claim 6, wherein said hydrophobic high polymer is selected from the group consisting of acrylic ester polymers, vinyl acetate base polymers, vinyl chloride base polymers, vinylidene chloride base polymers, styrene-butadiene base polymers, chloroprene base polymers, acrylonitrile butadiene base polymers, urethane base polymers and methyl-methacrylate-butadiene base polymers.

10. A process as claimed in claim 1, wherein said compound forming a high polymer is selected from the group consisting of photo-dimerizable and photo-sensitive resins, photo-decomposable and photo-sensitive resins and photo-reactive substances.

11. A process as claimed in claim 10, wherein said compound forming a high polymer is selected from the group consisting of cinnamic esters of polyvinyl alcohol, azides esters of polyvinyl alcohol, diazonium salts, and mixtures of polyvinyl alcohol and azide compounds and mixtures thereof.

12. A process as claimed in claim 1, wherein said solvent is selected from the group consisting of aliphatic hydrocarbons, aromatic hydrocarbons, halogenated hydrocarbons, alcohols, ketones and esters.

13. A process as claimed in claim 12, wherein said solvent is selected from the group consisting of n-hexane, n-heptane, n-octane, petroleum ether, petroleum benzine, ligroine, gasoline, benzene, toluene, ethylbenzene, trichloroethylene, perchloroethylene, carbon tetrachloride, methyl alcohol, ethyl alcohol, isopropyl alcohol, acetone, methyl ethyl ketone, methyl isobutyl ketone, methyl acetate and ethyl acetate.

14. A process as claimed in claim 1, wherein said aqueous dispersion system of said waxy substance and said fatty substance is prepared by the steps of adding a surface active agent, heating the system containing either one or both of the waxy and fatty substances and the surface active agent to a temperature higher than the melting point of the waxy and fatty substances under the atmospheric or reduced pressure, adding hot water followed by agitation to mix and to emulsify the waxy and fatty substances, and then cooling the system.

15. A process as claimed in claim 1, wherein a mixing ratio by weight in solid base between said first material and said second material is from 1:0.15 to 1:4.

16. A process as claimed in claim 1, wherein the light rays are irradiated on the membrane containing said compound forming a high polymer after said membrane is formed and the water contained therein is evaporated from said membrane.

* * * * *